July 4, 1933.  R. INSLEY  1,917,206
INTERNAL COMBUSTION ENGINE
Filed March 22, 1930  2 Sheets-Sheet 1
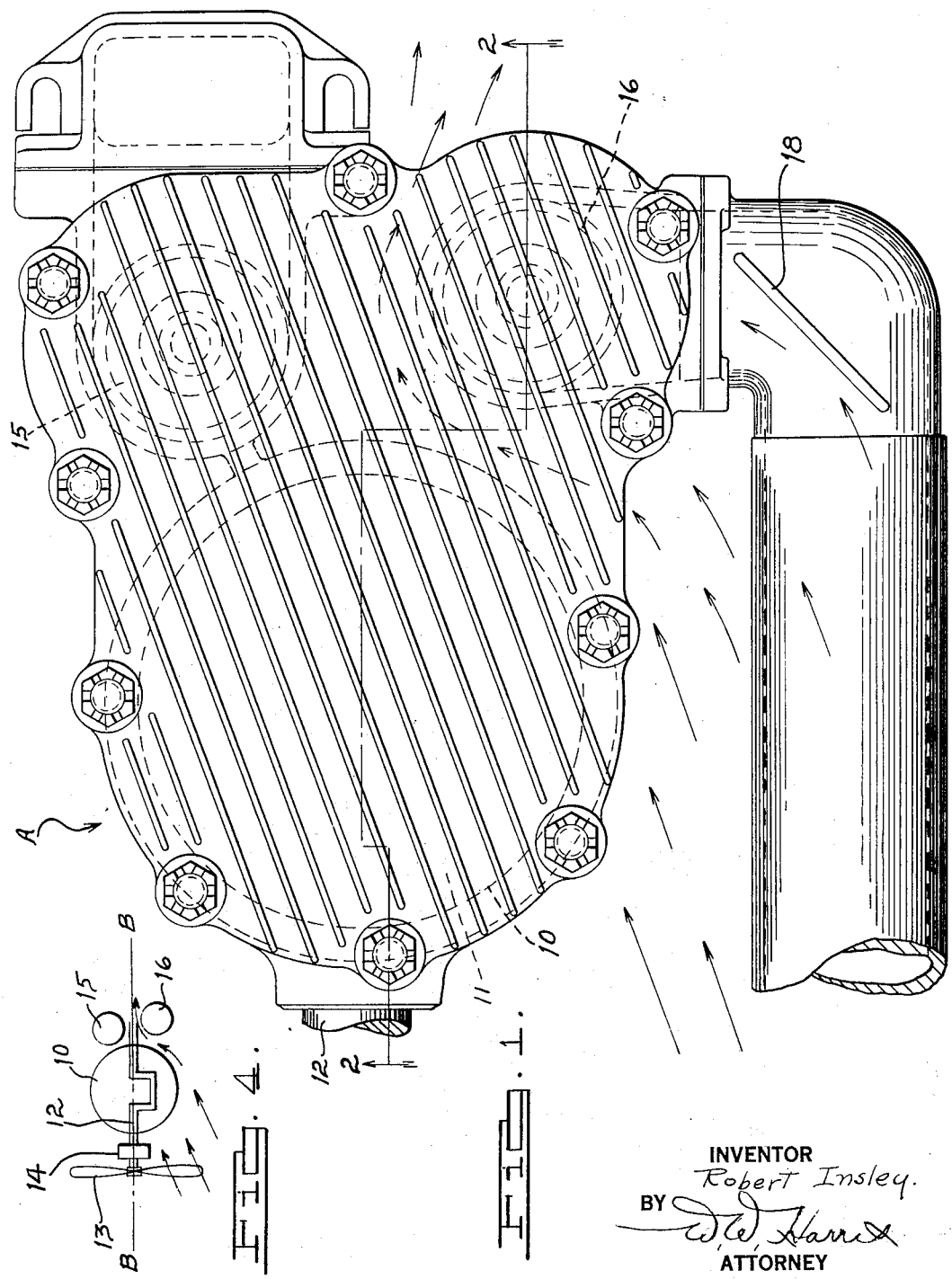
INVENTOR
Robert Insley.
BY
ATTORNEY July 4, 1933.   R. INSLEY   1,917,206
INTERNAL COMBUSTION ENGINE
Filed March 22, 1930   2 Sheets-Sheet 2
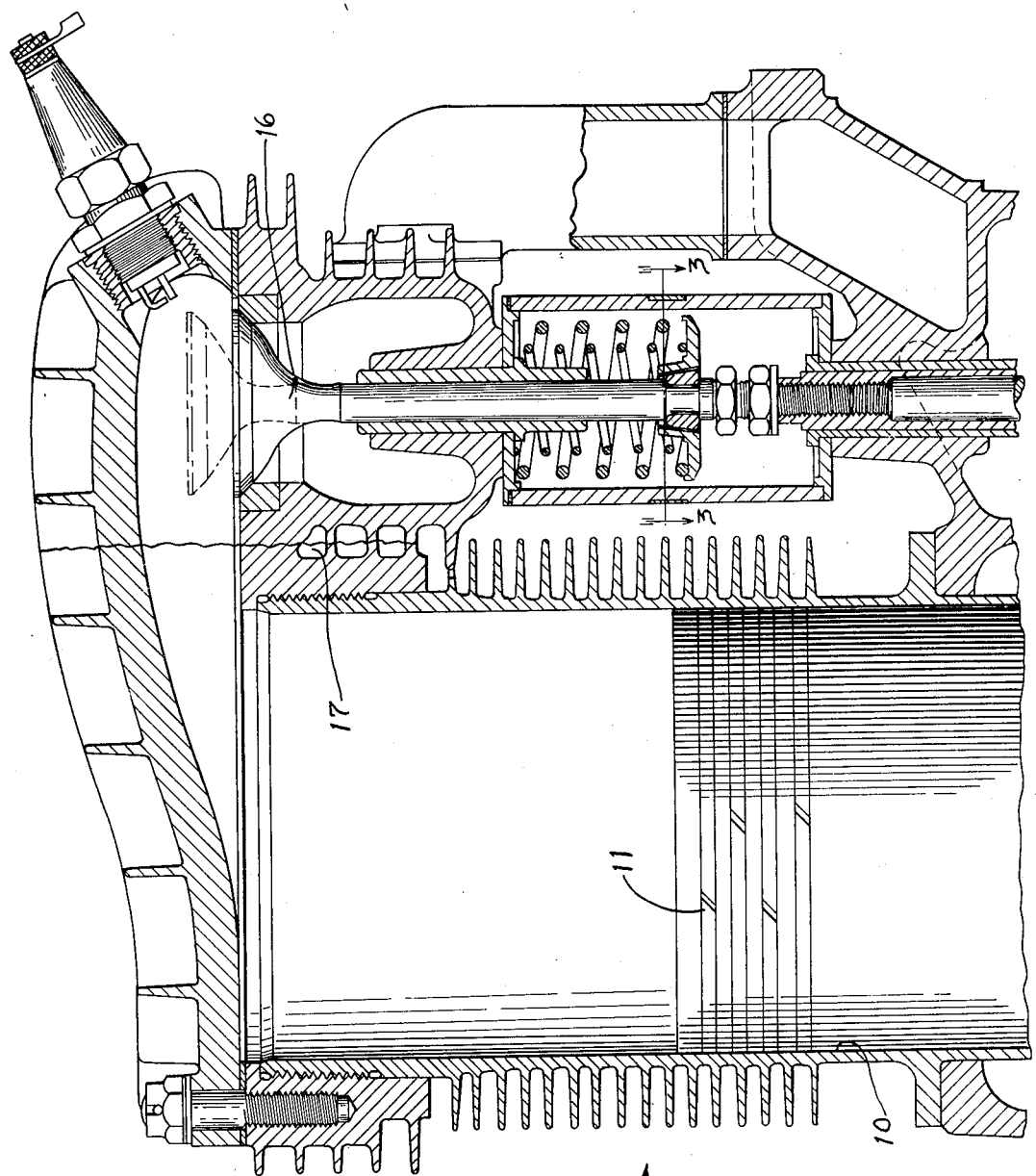
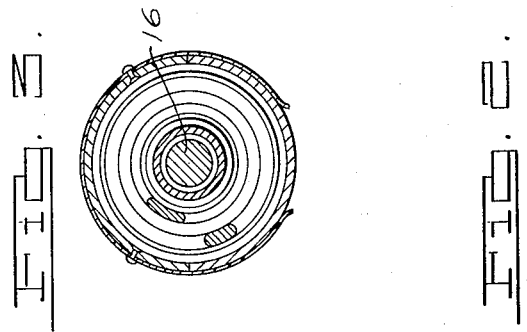
INVENTOR
Robert Insley.
BY
ATTORNEY Patented July 4, 1933

1,917,206

UNITED STATES PATENT OFFICE

ROBERT INSLEY, OF DETROIT, MICHIGAN, ASSIGNOR, BY MESNE ASSIGNMENTS, TO CONTINENTAL AIRCRAFT ENGINE COMPANY, A CORPORATION OF DELAWARE

INTERNAL COMBUSTION ENGINE

Application filed March 22, 1930. Serial No. 438,215.

My invention relates to internal combustion engines and more especially to air cooled engines of the L-head type adapted for use with aircraft. More particularly, my invention is related to an engine construction of the L-head radial type and to the arrangement for cooling the exhaust valve.

In an L-head engine of the radial type used especially for aircraft, the exhaust valve is subjected to a relatively greater amount of heat than the overhead valves used in other types of engines. These engine valves have usually been located to the front of the engine intermediate the propeller and cylinder, where the same can be exposed to the full blast of air thrown on the engine. However, it has been found more practical from every standpoint to locate the various accessories and driving mechanisms to the rear of the cylinder and consequently it became necessary to relatively lengthen the engine structure to provide means for supporting and actuating the engine valves in front of the cylinder. Prior to this time, engineers believed that an efficient cooling of an exhaust valve at the rear of the engine could not be had because the same was naturally shielded by the cylinder.

It is the object of my invention to overcome the aforesaid difficulties in cooling an L-head engine having an exhaust valve to the rear of the cylinder, by providing means for directing a maximum amount of air adjacent to the exhaust valve.

Another object of my invention is to improve the engine performance of an L-head air cooled radial internal combustion engine by conducting a portion of the air stream intermediate the exhaust valve and cylinder as well as subjecting the external area thereof to the cooling influence of the air stream, thereby effecting a more efficient cooling of the exhaust valve.

A further object of my invention is to facilitate the manufacture and maintenance of an L-head air cooled radial internal combustion engine and to provide a compact engine structure of minimum size and weight by positioning the valves to the rear of the cylinder where the valves and valve driving mechanism are readily accessible.

For a more detailed understanding of my invention, reference may be had to the accompanying drawings which illustrate one form which my invention may assume, and in which:

Fig. 1 is a plan view of one cylinder and associated valves of an L-head radial internal combustion engine constructed in accordance with my invention, Fig. 2 is a longitudinal sectional view of a portion of the engine taken substantially on the line 2—2 of Fig. 1, Fig. 3 is a detail sectional view of the valve spring enclosing means taken on the line 3—3 of Fig. 2, and Fig. 4 is a diagrammatic view of an engine constructed in accordance with my invention, and illustrating the relative position of the engine parts such as the valves, cylinder, crankshaft and propeller.

As illustrative of my invention, I have shown a single cylinder, since all cylinders and associated valves are similar in construction, and my invention is preferably incorporated in an L-head engine of the radial type. In general the engine comprises an engine structure A provided with a cylinder 10, a piston 11 being supported within the cylinder and operatively connected with a crankshaft 12 in the usual manner. A propeller 13 is operatively connected with the crankshaft and may be directly driven by the crankshaft or driven through a suitable type of reducing gear mechanism 14. An intake valve 15 and an exhaust valve 16 are both located generally to the rear of the cylinder, the cylinder lying intermediate the valves and propeller. These valves may be actuated in any suitable manner, and inasmuch as the particular means for actuating the valves form no part of this invention, the same is not illustrated.

The propeller is actuated in a counterclockwise direction as viewed from the front and sets an air stream into motion in a direction as indicated by the arrows in Figs. 1 and 4, which is oblique to the longitudinal plane of the engine containing the crankshaft and cylinder axes, this plane being indicated in Fig. 4 by the reference character B—B.

It is noted that the intake and exhaust valves are offset with respect to this engine plane B—B, the intake valve located to one side of the plane and the exhaust valve located to the opposite side thereof.

It may be further noted that the exhaust valve 16 is located in that part of the engine structure that faces the air stream. Because of the fact that the air stream is directed obliquely with respect to the longitudinal engine plane, it will be seen that a large portion of the external area of the exhaust valve is directly exposed to the air stream, while the intake valve is substantially shielded from the air stream by the intervening cylinder structure. In other words, the exhaust valve is located in the direct path of the air stream.

To facilitate the cooling of the exhaust valve, means are provided for conducting a portion of the air stream through the engine structure intermediate the exhaust valve and cylinder. This is accomplished by providing a plurality of passages 17 forming air galleries, which extend between the exhaust valve and cylinder and between the intake and exhaust valves. A deflector 18 may be secured in any suitable way to a portion of the exhaust manifold 19, or to any other part of the engine structure suitable for my purpose, for partially deflecting the air stream and causing the same to be more directly thrown against the external area of the exhaust valve and into the passages 17.

It will be noted that the mouths of each of the passages 17 are substantially aligned with the air stream, thereby causing a maximum amount of air to pass through the passages. With further reference to the engine structure, it will be seen that the exhaust valve is spaced a greater distance from the cylinder than the intake valve to permit the construction of an air passage of maximum volume between the valve and cylinder. It may be further noted that the cylinder and the external portion of the valve are provided with fins, and the fins located on the top of the cylinder head are arranged obliquely to the longitudinal plane of the engine and substantially parallel to the air stream for effecting a maximum external cooling of the engine.

Although I have illustrated but one form of my invention and have described in detail but a single application thereof, it will be apparent to those skilled in the art to which my invention pertains that various modifications and changes may be made therein without departing from the spirit of my invention or from the scope of the appended claims.

What I claim as my invention is:

1. In an air cooled internal combustion engine of the radial cylinder type, an engine structure having a cylinder and a crankshaft, a propeller operatively connected with said crankshaft, said engine structure subjected to the cooling influences of an air stream induced by said propeller and directed substantially against the front of the engine structure, and an exhaust valve located generally to the rear of said cylinder and lying in the path of a portion of said air stream.

2. In an air cooled internal combustion engine of the radial cylinder type, an engine structure having a cylinder and a crankshaft, a propeller operatively connected with said crankshaft, said engine structure subjected to the cooling influence of an air stream induced by said propeller and directed obliquely relative to a longitudinal plane of the engine containing the crankshaft and cylinder axes, and an exhaust valve located generally to the rear of said cylinder and lying in the direct path of a portion of said air stream.

3. In an air cooled internal combustion engine of the radial cylinder type, an engine structure having a cylinder and a crankshaft, a propeller operatively connected with said crankshaft, said engine structure subjected to the cooling influence of an air stream induced by said propeller and directed obliquely relative to a longitudinal plane of the engine containing the crankshaft and cylinder axes, and an exhaust valve located generally to the rear of said cylinder and offset to one side of said longitudinal plane of the engine to lie in the direct path of a portion of said air stream.

4. In an air cooled internal combustion engine of the radial cylinder type, an engine structure having a cylinder and a crankshaft, a propeller operatively connected with said crankshaft, said engine structure subjected to the cooling influences of an air stream induced by said propeller and directed obliquely relative to a longitudinal plane of the engine containing the crankshaft and cylinder axes, and intake and exhaust valves located generally to the rear of said cylinder and offset on opposite sides of the longitudinal plane of said engine, said exhaust valve being positioned to lie in the direct path of a portion of said air stream.

5. In an internal combustion engine for aircraft, an engine structure having a cylinder, a crankshaft, a propeller operatively connected with said crankshaft, and intake and exhaust valves located generally to the rear of said cylinder, the cylinder located intermediate the valves and propeller and subjected to the cooling influences of an air stream induced by said propeller, the exhaust valve being offset to one side of the longitudinal plane of the engine containing the crankshaft and cylinder axes and lying in the direct path of the air stream.

6. In an internal combustion engine for aircraft, an engine structure having a cylinder, a crankshaft, a propeller operatively connected with said crankshaft, and intake and exhaust valves located generally to the rear of said cylinder, the cylinder located intermediate the valves and propeller and subjected to the cooling influences of an air stream induced by said propeller, said intake and exhaust valves offset on opposite sides of the longitudinal plane of the engine containing the crankshaft and cylinder axes, said exhaust valve being positioned in the direct path of the air stream.

7. In an internal combustion engine for aircraft, an engine structure having a cylinder, a crankshaft, a propeller operatively connected with said crankshaft, and intake and exhaust valves located generally to the rear of said cylinder, the cylinder located intermediate the valves and propeller and subjected to the cooling influences of an air stream induced by said propeller, said air stream directed obliquely to the longitudinal plane of the engine containing the crankshaft and cylinder axes, the exhaust valve being offset to one side of the said longitudinal plane and lying in the direct path of the air stream.

8. In an internal combustion engine for aircraft, an engine structure having a cylinder, a crankshaft, a propeller operatively connected with said crankshaft, and intake and exhaust valves located generally to the rear of said cylinder, the engine structure subjected to the cooling influences of an air stream induced by said propeller and directed obliquely to the longitudinal plane of the engine containing the crankshaft and cylinder axes, the exhaust valve offset from the said longitudinal engine plane and located adjacent the side of the cylinder facing said air stream.

9. In an internal combustion engine for aircraft, an engine structure having a cylinder, a crankshaft, a propeller operatively connected with said crankshaft, intake and exhaust valves located generally to the rear of said cylinder, the engine structure subjected to the cooling influences of an air stream induced by said propeller, and means for conducting a portion of said air stream intermediate the cylinder and exhaust valve.

10. In an internal combustion engine for aircraft, an engine structure having a cylinder, a crankshaft, a propeller operatively connected with said crankshaft, intake and exhaust valves located generally to the rear of said cylinder, the engine structure subjected to the cooling influences of an air stream induced by said propeller, and means for conducting a portion of said air stream intermediate the exhaust valve and the said cylinder and adjacent intake valve.

11. In an internal combustion engine for aircraft, an engine structure having a cylinder, a crankshaft, a propeller operatively connected with said crankshaft, intake and exhaust valves located generally to the rear of said cylinder, the cylinder and said exhaust valve subjected to the cooling influences of an air stream induced by said propeller, said engine structure provided with an air passage extending intermediate the exhaust valve and cylinder.

12. In an internal combustion engine for aircraft, an engine structure having a cylinder, a crankshaft, a propeller operatively connected with said crankshaft, intake and exhaust valves located generally to the rear of said cylinder, the cylinder and said exhaust valve subjected to the cooling influences of an air stream induced by said propeller, said engine structure provided with an air passage extending around said exhaust valve and intermediate the exhaust valve and the said cylinder and adjacent intake valve, thereby subjecting all sides of the exhaust valve to the cooling influences of the air stream.

13. In an internal combustion engine for aircraft, an engine structure having a cylinder, a crankshaft, a propeller operatively connected with said crankshaft, intake and exhaust valves located generally to the rear of said cylinder, the cylinder and said exhaust valve subjected to the cooling influences of an air stream induced by said propeller, said engine structure provided with a plurality of galleries intermediate the exhaust valve and cylinder for conducting air.

14. In an air cooled internal combustion engine for aircraft, an engine structure having a cylinder, a crankshaft, a propeller operatively connected with said crankshaft, intake and exhaust valves located generally to the rear of said cylinder, the engine structure being subjected to the cooling influences of an air stream induced by said propeller and directed obliquely to the longitudinal plane of the engine containing the crankshaft and cylinder axes, said engine structure provided with an air passage extending intermediate the exhaust valve and cylinder, the mouth of said air passage being substantially aligned with the air stream to induce a maximum volume of air to enter said air passage.

15. In an air cooled internal combustion engine for aircraft, an engine structure having a cylinder, a crankshaft, a propeller operatively connected with said crankshaft, intake and exhaust valves located generally to the rear of said cylinder, the engine structure being subjected to the cooling influences of an air stream induced by said propeller and directed obliquely to the longitudinal plane of the engine containing the crankshaft and cylinder axes, said engine structure provided with an air passage extending intermediate the exhaust valve and cylinder, the mouth of said air passage being substantially alined with the air stream to induce a maximum volume of air to enter said air passage, and means for deflecting the air stream into said air passage.

16. In an internal combustion engine for aircraft, an engine structure having a cylinder, a crankshaft, a propeller operatively connected with said crankshaft, intake and exhaust valves located generally to the rear of said cylinder, the cylinder and said exhaust valve subjected to the cooling influences of an air stream induced by said propeller, the exhaust valve located a greater relative distance from the cylinder than the intake valve, said engine structure provided with an air passage extending intermediate the exhaust valve and cylinder.

17. In an air cooled internal combustion engine for aircraft, an engine structure of the L-head type having a cylinder, a crankshaft, a propeller operatively connected with said crankshaft, intake and exhaust valves located generally to the rear of said cylinder, the cylinder lying intermediate the propeller and said valves, said exhaust valve and cylinder being subjected to the cooling influences of an air stream induced by the propeller, and means for conducting a portion of said air stream intermediate the exhaust valve and cylinder.

18. In an internal combustion engine, an engine structure having a cylinder, an associated cylinder head structure and a crankshaft, means for inducing air flow externally of said engine structure and obliquely with respect to said crankshaft axis, and cooling fins carried by said cylinder head structure and arranged to extend obliquely to an engine plane containing the cylinder and crankshaft axes and substantially parallel to the direction of the air stream.

19. In an air cooled internal combustion engine for aircraft, an engine structure having a crankshaft, a cylinder and associated cylinder head structure, a propeller operatively driven by said crankshaft and adapted for propelling an air stream against said engine structure in a direction obliquely with respect to said crankshaft axis, and cooling fins carried by said cylinder head structure and extending substantially parallel to the direction of the air stream.

20. In an air cooled internal combustion engine for aircraft, an engine structure having a crankshaft, a plurality of cylinders extending radially with respect to said crankshaft and each having an associated cylinder head structure, a propeller operatively driven by said crankshaft and adapted for propelling an air stream against said engine structure in an oblique direction with respect to said crankshaft axis, and cooling fins carried by each of said cylinder head structures and extending substantially parallel to the direction of the air stream.

21. In an air cooled internal combustion engine for aircraft, an engine structure having a crankshaft, a cylinder and associated cylinder head structure, a propeller operatively driven by said crankshaft and adapted for propelling an air stream against said engine structure in a direction obliquely with respect to said crankshaft axis, and cooling fins carried by said cylinder head structure, said cooling fins extending substantially parallel to the direction of the air stream and projected outwardly substantially parallel to the cylinder axis.

In testimony whereof I affix my signature.

ROBERT INSLEY.